US008751119B2

(12) United States Patent
Takashiro (10) Patent No.: US 8,751,119 B2
(45) Date of Patent: Jun. 10, 2014

(54) VEHICLE CONTROL DEVICE AND VEHICLE CONTROL METHOD (75) Inventor: Yosuke Takashiro, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 276 days.

(21) Appl. No.: 13/320,713

(22) PCT Filed: Aug. 27, 2009

(86) PCT No.: PCT/JP2009/064923
§ 371 (c)(1),
(2), (4) Date: Nov. 15, 2011

(87) PCT Pub. No.: WO2010/146724
PCT Pub. Date: Dec. 23, 2010

(65) Prior Publication Data
US 2012/0078477 A1 Mar. 29, 2012

(30) Foreign Application Priority Data
Jun. 19, 2009 (JP) ................................. 2009-146610

(51) Int. Cl.
B60W 10/00 (2006.01)
(52) U.S. Cl.
USPC .................. 701/52; 701/51; 701/58; 701/65; 477/34; 477/43; 476/1
(58) Field of Classification Search
None
See application file for complete search history.

(56) References Cited

U.S. PATENT DOCUMENTS

| 4,854,194 A | * | 8/1989 | Kaneko et al. | 477/97 |
| 5,678,453 A | * | 10/1997 | Dresden, III | 74/335 |
| 5,761,628 A | * | 6/1998 | Steeby et al. | 701/64 |
| 5,875,410 A | * | 2/1999 | Fowler et al. | 701/64 |
| 5,984,828 A | * | 11/1999 | Huber | 477/78 |
| 7,445,079 B2 | * | 11/2008 | Biallas | 180/338 |
| 8,554,431 B2 | * | 10/2013 | Eriksson et al. | 701/65 |
| 2001/0021683 A1 | * | 9/2001 | Takagi et al. | 477/37 |
| 2001/0023384 A1 | * | 9/2001 | Nishimura | 701/51 |
| 2001/0027148 A1 | * | 10/2001 | Nishimura | 477/92 |
| 2001/0037697 A1 | * | 11/2001 | Nanri et al. | 74/335 |
| 2002/0193930 A1 | * | 12/2002 | Matsubara et al. | 701/54 |
| 2004/0060378 A1 | * | 4/2004 | Yamamoto et al. | 74/335 |

(Continued)

FOREIGN PATENT DOCUMENTS

| JP | A-11-159610 | 6/1999 |
| JP | A-2001-304386 | 10/2001 |
| JP | A-2009-154738 | 7/2009 |

OTHER PUBLICATIONS

International Search Report issued in International Patent Application No. PCT/JP2009/064923 dated Nov. 2, 2009.

Primary Examiner — Jonathan M Dager
(74) Attorney, Agent, or Firm — Oliff PLC (57) ABSTRACT An ECU executes a program including the steps of changing a target shift stage when a current shift change mode is set to an automatic shift change mode and when a driver has intention to change a shift stage, changing a shift range to an N range when he/she has intention for neutral, maintaining the automatic shift change mode when it is determined that he/she does not have intention for neutral but he/she has intention to switch the shift change mode and when such determination is made for the first time after return from the N range, and switching the shift change mode to a manual shift change mode when such determination is not made for the first time.

12 Claims, 5 Drawing Sheets (56) References Cited

U.S. PATENT DOCUMENTS

2006/0053930 A1* 3/2006 Morita et al. .............. 74/473.18
2007/0270281 A1* 11/2007 Inoue et al. ................... 477/180
2008/0293539 A1* 11/2008 Matsubara et al. ............. 477/37
2009/0076693 A1* 3/2009 Kumazaki et al. .............. 701/55
2009/0157269 A1* 6/2009 Matsubara et al. ............. 701/54
2010/0041515 A1* 2/2010 Ohkubo ........................ 477/175
2010/0121542 A1* 5/2010 Tsukamoto et al. ............ 701/51
2011/0320096 A1* 12/2011 Itazu et al. ..................... 701/58

\* cited by examiner

VEHICLE CONTROL DEVICE AND VEHICLE CONTROL METHOD

TECHNICAL FIELD

The present invention relates to control of a vehicle incorporating an automatic transmission having a manual shift change mode and an automatic shift change mode, and particularly to a technique for setting a shift change mode following a driver's intention at the time of return from an N range.

BACKGROUND ART

An automatic transmission allowing selection between an automatic shift change mode in which automatic shift change is made based on a state of a vehicle (such as a vehicle speed or an accelerator position) and on a shift change map stored in advance and a manual shift change mode in which a shift stage can stepwise be changed by a driver's operation of a switch, a lever or the like has conventionally been known.

For example, Japanese Patent Laying-Open No. 2001-304386 (PTL 1) discloses as such an automatic transmission, a continuously variable transmission for an automobile, with which, even when switching from an automatic shift change mode to a manual shift change mode is made, a proper speed ratio can be maintained without undue fluctuation in an actual speed ratio, and after transition to the manual shift change mode is completed, a speed ratio prepared in advance as a speed ratio for the manual shift change mode is appropriately selected and a shift operation can be made. This continuously variable transmission for an automobile includes drive condition detection means for detecting a drive condition of a vehicle, automatic shift change control means for calculating a target speed ratio for an automatic shift change mode based on the drive condition detected by the drive condition detection means, manual shift change control means for calculating a target speed ratio for a manual shift change mode based on a driver's shift operation, a mode switch for switching a shift change mode, and speed ratio control means for feedback control of an actuator for adjusting a speed ratio such that an actual speed ratio matches with the target speed ratio based on difference between the target speed ratio and the actual speed ratio, characterized by including shift change mode determination means for detecting switching of the shift change mode, drive operation state determination means for determining drive operation contents by the driver that is started up at the time point of detection of switching from the automatic shift change mode to the manual shift change mode by the shift change mode determination means, and target speed ratio calculation means for setting the actual speed ratio immediately before detection of switching from the automatic shift change mode to the manual shift change mode by the shift change mode determination means as an initial value for the target speed ratio in the manual shift change mode and selecting any one of an up-shift side speed ratio and a down-shift side speed ratio in the manual shift change mode closer to the initial value based on the drive operation contents determined by the drive operation state determination means so as to gradually change the target speed ratio from the initial value toward the up-shift side speed ratio or the down-shift side speed ratio.

According to the continuously variable transmission for an automobile disclosed in the publication described above, even in switching from the automatic shift change mode to the manual shift change mode, a proper speed ratio can be maintained without undue fluctuation in the actual speed ratio.

CITATION LIST

Patent Literature

PTL 1: Japanese Patent Laying-Open No. 2001-304386

SUMMARY OF INVENTION

Technical Problem

While stopping at a red light, driving in heavy traffic or the like, a driver may change a shift range of the automatic transmission to a neutral range (hereinafter denoted as an N range) in order to suppress deterioration in fuel efficiency. If a shift change mode after return from the N range is predetermined, however, the driver may not be able to select a desired shift change mode unless he/she further performs an operation to change the shift change mode, following an operation to return from the N range. Therefore, the driver has to take the trouble to operate the shift change mode in returning from the N range and the operation cannot be simplified.

In the continuously variable transmission for an automobile disclosed in the publication described above, such a problem is not taken into account and the problem cannot be solved.

An object of the present invention is to provide a vehicle control device and a vehicle control method for setting a shift change mode matching with the driver's intention with an operation being simplified, after return from an N range.

Solution to Problem

A vehicle control device according to one aspect of the present invention is a vehicle control device for controlling a vehicle incorporating an automatic transmission capable of selecting as a shift change mode, any of an automatic shift change mode for automatically changing a speed ratio in accordance with a state of the vehicle and a manual shift change mode for changing stepwise a speed ratio in response to a driver's request. The automatic transmission is capable of switching a shift range between a power cut-off range for cutting off transfer of power from a power source and a power transfer range for transferring power from the power source. This vehicle control device includes a range switching unit for switching the shift range in response to the driver's request, and a mode selection unit for causing temporary storage of the shift change mode that has been selected when switching from the power transfer range to the power cut-off range is made by the range switching unit and selecting the stored shift change mode when the range switching unit indicates return from the power cut-off range to the power transfer range.

According to the present invention, the shift change mode selected at the time when switching from the power transfer range to the power cut-off range is made by the range switching unit is temporarily stored, and when return from the power cut-off range to the power transfer range is indicated, the shift change mode that has been stored is selected. The shift change mode matching with the driver's intention is selected without the driver's operation for changing the shift change mode after return from the power cut-off range. Therefore, a vehicle control device and a vehicle control method for setting a shift change mode matching with the driver's intention with an operation being simplified, after return from the N range, can be provided.

Preferably, for the automatic transmission, a plurality of shift stages that can be changed in response to a request operation by the driver while the manual shift change mode is selected are set. The mode selection unit causes return from the power cut-off range to the power transfer range and holds the automatic shift change mode in response to a first request operation by the driver for changing a stage of the shift stage while the shift range is set to the power cut-off range and while the automatic shift change mode is selected, and the mode selection unit selects the manual shift change mode in response to a second request operation for changing a stage of the shift stage.

According to the present invention, the shift stage at the time of start of the vehicle after the shift range returned from the power cut-off range to the power transfer range is the same both in a case where the automatic shift change mode is selected and in a case where the manual shift change mode is selected. Therefore, in response to the first request operation for changing a stage of the shift stage, the automatic shift change mode is held while return from the power cut-off range to the power transfer range is made. Thus, whichever shift change mode may be requested by the driver, so long as the vehicle can start as it returns from the power cut-off range in response to the first request operation, it is not contrary to the driver's intention. When the driver performs a second request operation for changing the shift stage, it can be identified that the driver is requesting selection of the manual shift change mode. Therefore, the shift change mode matching with the driver's intention can be set by selecting the manual shift change mode in response to the second request operation.

Further preferably, for the automatic transmission, a plurality of shift stages that can be changed in response to the driver's request while the manual shift change mode is selected are set. The vehicle includes a first operation member and a second operation member for the driver to request any of selection of the shift change mode, switching of the shift range, and change in a stage of the shift stage. The vehicle control device further includes a shift stage change unit for changing a stage of the shift stage when the driver operates any one of the first operation member and the second operation member while the manual shift change mode is selected. The mode selection unit selects the manual shift change mode when the driver operates any one of the first operation member and the second operation member while the automatic shift change mode is selected. The range switching unit switches the shift range from the power transfer range to the power cut-off range when the driver operates both of the first operation member and the second operation member in parallel.

According to the present invention, when the driver operates any one of the first operation member and the second operation member while the manual shift change mode is selected, change to a stage in accordance with the driver's request for changing a stage of the shift stage can be made by changing the stage of the shift stage. Alternatively, when the driver operates any one of the first operation member and the second operation member while the automatic shift change mode is selected, it can be identified that the driver is requesting manual change in a stage of the shift stage. Thus, the shift change mode matching with the driver's intention can be set by switching the shift change mode from the automatic shift change mode to the manual shift change mode. In addition, the driver can switch the shift range from the power transfer range to the power cut-off range by operating both of the first operation member and the second operation member in parallel. Since the driver can change a shift stage, change the shift range, and change the shift change mode by operating the first operation member and the second operation member, the operation can be simplified.

Further preferably, the first operation member and the second operation member are switched between an operated state in which each of them has been operated by the driver to a predetermined position and a normally-off state in which an operation by the driver has been canceled. The mode selection unit refrains from changing the shift change mode at least until both of the first operation member and the second operation member enter the operated state in parallel while any one of the first operation member and the second operation member is in the operated state.

According to the present invention, if any one of the first operation member and the second operation member is in the operated state, it cannot be expected whether any one of them subsequently makes transition from the operated state to the normally-off state or the other of them enters the operated state, and hence it cannot be identified whether the driver is requesting change in the shift change mode or not. If the shift change mode is changed in such a state, the shift change mode may be changed frequently. Therefore, at least until both operation members enter the operated state in parallel, change in the shift change mode is refrained so that frequent change in the shift change mode can be suppressed.

Further preferably, the mode selection unit changes the shift change mode when any one of the first operation member and the second operation member is set to the normally-off state from the operated state.

According to the present invention, when any one of the first operation member and the second operation member is set to the normally-off state from the operated state, it can be identified that the driver is requesting change in the shift change mode, rather than change in the shift range. Therefore, the shift change mode matching with the driver's intention can be set by changing the shift change mode.

Further preferably, the shift stage change unit starts to change a stage of the shift stage when any one of the first operation member and the second operation member is set to the operated state.

According to the present invention, the shift stage can be changed with good responsiveness by starting change in a stage of the shift stage at the time point when any one of the first operation member and the second operation member is set to the operated state.

Advantageous Effects of Invention

According to the present invention, the shift change mode selected at the time when switching from the power transfer range to the power cut-off range is made by the range switching unit is temporarily stored, and when return from the power cut-off range to the power transfer range is indicated, the shift change mode that has been stored is selected. The shift change mode matching with the driver's intention is selected without the driver's operation for changing the shift change mode after return from the power cut-off range. Therefore, a vehicle control device and a vehicle control method for setting a shift change mode matching with the driver's intention with an operation being simplified, after return from the N range, can be provided.

DESCRIPTION OF EMBODIMENTS

An embodiment of the present invention will be described hereinafter with reference to the drawings. In the description below, the same elements have the same reference characters allotted. Their label and function are also identical. Therefore, detailed description thereof will not be repeated.

Figure 1:
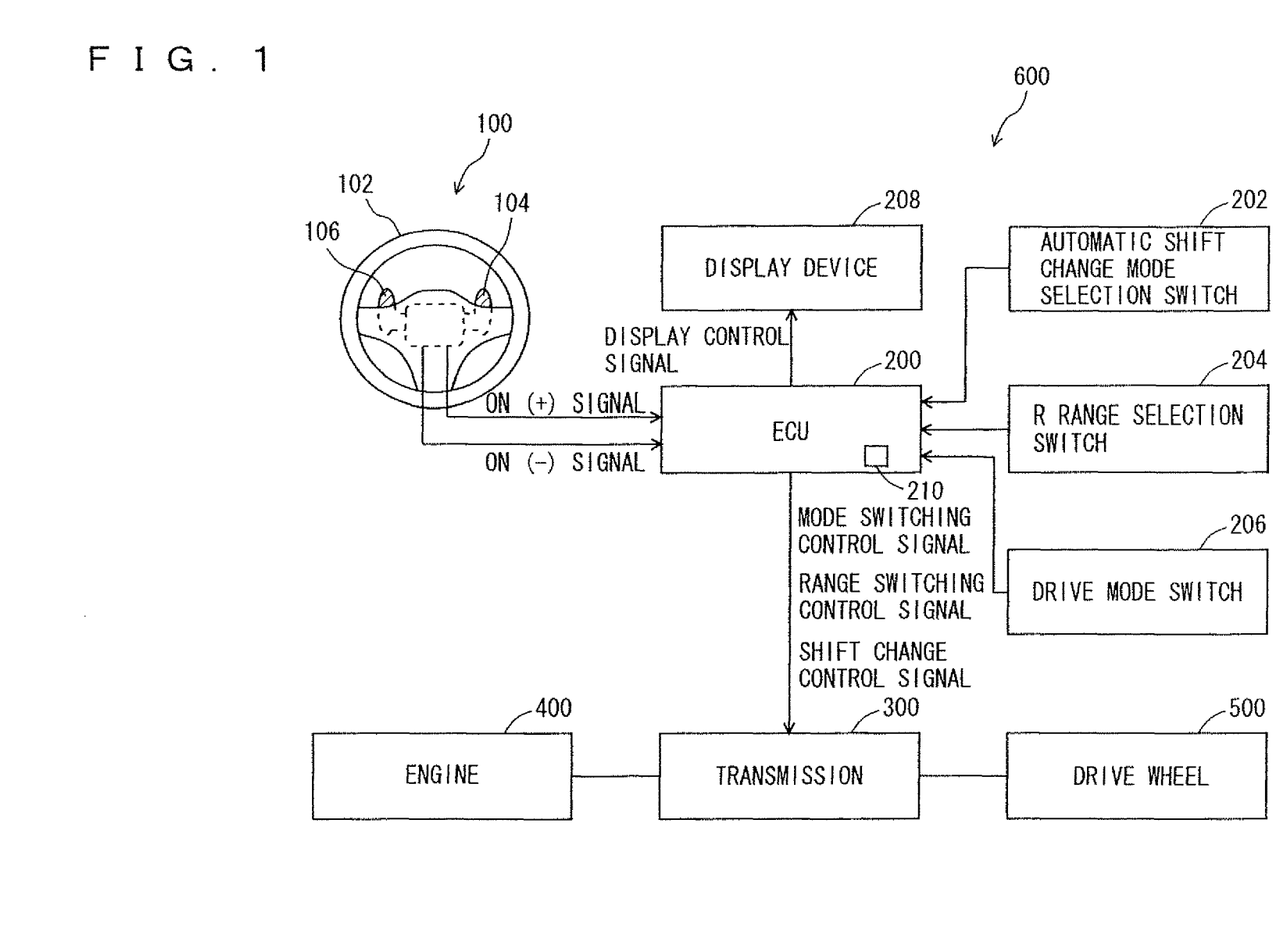
FIG. 1 is a schematic block diagram of a vehicle incorporating a vehicle control device according to the present embodiment.

A vehicle 600 includes an engine 400, a transmission 300, a drive wheel 500, an operation device 100, an ECU (Electronic Control Unit) 200, an automatic shift change mode selection switch 202, an R range selection switch 204, a drive mode switch 206, and a display device 208.

Engine 400 serves as a power source for vehicle 600. The power source for vehicle 600 may include a rotating electric machine instead of or in addition to engine 400. Power from engine 400 is transferred to transmission 300.

Transmission 300 makes shift change of power from engine 400 serving as the power source, and transfers the resultant power to drive wheel 500. In the present embodiment, transmission 300 is an automatic transmission. It is noted that transmission 300 should only be an automatic transmission, and it may be a gear-type automatic transmission or a continuously variable automatic transmission.

Transmission 300 allows selection as a shift change mode, of any of an automatic shift change mode in which a speed ratio is automatically changed based on a drive state of vehicle 600 and on a shift change map and a manual shift change mode in which a speed ratio is changed stepwise in response to a driver's request.

Transmission 300 allows switching of the shift range between the power cut-off range in which transfer of power from engine 400 serving as the power source to drive wheel 500 is cut off and the power transfer range in which power is transferred from the power source to drive wheel 500, in response to the driver's request.

The power transfer range includes a forward drive range (hereinafter also denoted as a D range) and a rearward drive range (hereinafter also denoted as an R range). The power cut-off range includes a neutral range (hereinafter also denoted as an N range).

Receiving a mode switching control signal indicating a request to switch a shift change mode from ECU 200, transmission 300 switches to the shift change mode in accordance with the request, from any one of the automatic shift change mode and the manual shift change mode to the other.

Receiving a shift change control signal indicating a request to change a stage of the shift stage from ECU 200, transmission 300 changes the stage to the shift stage increased by one from the current shift stage or to the shift stage decreased by one therefrom.

In addition, receiving a range switching control signal indicating a request to switch the shift range from ECU 200, transmission 300 switches the shift range from any one of the N range and the power transfer range (the D range or the R range) to the other.

Automatic shift change mode selection switch 202, R range selection switch 204 and drive mode switch 206 are connected to ECU 200.

Automatic shift change mode selection switch 202 accepts a driver's operation to change the shift change mode. Automatic shift change mode selection switch 202 transmits an ON signal to ECU 200 when it accepts the driver's operation to change the shift change mode.

For example, when ECU 200 received the ON signal from automatic shift change mode selection switch 202 while the manual shift change mode is selected, ECU 200 transmits the mode switching control signal to transmission 300 such that the shift change mode is switched from the manual shift change mode to the automatic shift change mode.

R range selection switch 204 accepts a driver's operation to select the R range. When R range selection switch 204 accepts the driver's operation to select the R range, it transmits an ON signal to ECU 200.

For example, when ECU 200 received the ON signal from R range selection switch 204 while the shift range is set to the N range, ECU 200 transmits the range switching control signal to transmission 300 such that the shift range is switched from the N range to the R range.

Drive mode switch 206 accepts a driver's operation to switch the drive mode. When drive mode switch 206 accepts the driver's operation to switch the drive mode, it transmits an ON signal to ECU 200.

For example, when ECU 200 receives the ON signal from drive mode switch 206 while the manual shift change mode is selected, ECU 200 controls transmission 300 to switch from the current drive mode to any one drive mode other than the current drive mode, among a normal drive mode, a sport drive mode, and a wet drive mode.

When ECU 200 receives the ON signal from drive mode switch 206 while the automatic shift change mode is selected, ECU 200 transmits the mode switching control signal to transmission 300 such that the shift change mode is switched from the automatic shift change mode to the manual shift change mode.

The sport drive mode refers, for example, to a drive mode in which acceleration performance of the vehicle is improved as compared with a case where the normal drive mode is selected. For example, when the sport drive mode is selected, an upper limit value of an engine speed may be increased, responsiveness of the engine speed may be improved, or timing of shift change may be delayed, as compared with a case where the normal drive mode is selected. Alternatively, in a case where transmission 300 is implemented as a continuously variable automatic transmission, a speed ratio corresponding to a stage of the shift stage may be varied such that acceleration performance is improved.

The wet drive mode refers, for example, to a drive mode in which occurrence of slip of wheels is suppressed during running on a road low in coefficient of friction, as compared with a case where the normal drive mode is selected. For example, when the wet drive mode is selected, an upper limit value of an engine speed may be decreased, responsiveness of the engine speed may be lowered, or timing of shift change may be advanced, as compared with a case where the normal drive mode is selected. Alternatively, in a case where transmission 300 is implemented as a continuously variable automatic transmission, a speed ratio corresponding to the shift stage may be varied such that the vehicle gently starts.

Figure 2:
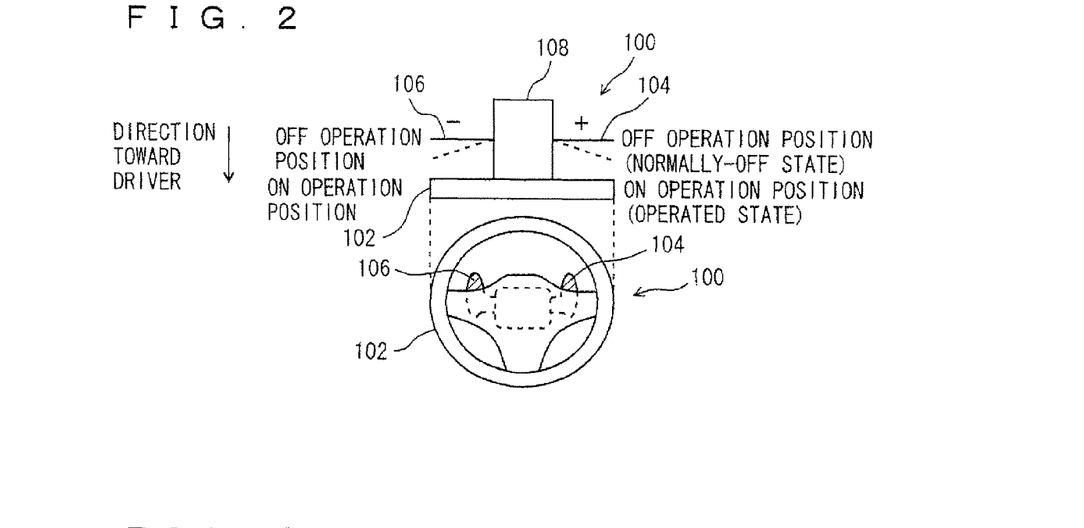
FIG. 2 is a diagram showing a configuration of an operation device in the present embodiment.

Operation device 100 includes a steering wheel 102, a paddle switch (+) 104, and a paddle switch (−) 106. Steering wheel 102 is an operation member for the driver to turn vehicle 600.

Paddle switch (+) 104 and paddle switch (−) 106 are operation members for accepting an operation for changing the shift change mode, the shift range, and the stage of the shift stage from the driver. Paddle switch (+) 104 and paddle switch (−) 106 are connected to ECU 200.

Receiving a driver's operation, paddle switch (+) 104 transmits an ON (+) signal to ECU 200. Similarly, receiving a driver's operation, paddle switch (−) 106 transmits an ON (−) signal to ECU 200.

ECU 200 includes a memory 210. Memory 210 stores currently selected stage of the shift stage, shift range and shift change mode.

Display device 208 provided around a driver's seat at a position visually recognizable by the driver is connected to ECU 200. Display device 208 includes, for example, an LED (Light Emitting Diode), an LCD (Liquid Crystal Display) and the like, and displays at least any one of currently selected stage of the shift stage, shift range and shift change mode. ECU 200 transmits a control signal to display device 208 so as to display on display device 208, the stage of the shift stage, the shift range, and the shift change mode stored in memory 210. Display device 208 displays the stage of the shift stage, the shift range, and the shift change mode based on the control signal from ECU 200.

As shown in FIG. 2, paddle switch (+) 104 and paddle switch (−) 106 are operation members having a shape of a lever symmetric to each other. Paddle switch (+) 104 and paddle switch (−) 106 are each implemented, for example, by a momentary switch in the present embodiment.

For example, when the driver performs an operation to pull a lever portion of paddle switch (+) 104 toward the driver (hereinafter also referred to as an ON operation) so that paddle switch (+) 104 moves to an ON operation position shown with a dashed line in FIG. 2, the ON (+) signal is output from paddle switch (+) 104 to ECU 200. The state that paddle switch (+) 104 has been operated to the "ON operation position" corresponds to the "operated state" in which the driver operated paddle switch (+) 104 to a predetermined position.

When the driver canceled the operation of paddle switch (+) 104 (hereinafter also referred to as an OFF operation) or when the driver's operation is not accepted, paddle switch (+) 104 is held at a position corresponding to an OFF operation position shown with a solid line in FIG. 2, by a mechanical mechanism or the like with the use of an elastic member such as a spring. Here, paddle switch (+) 104 stops output of the ON (+) signal to ECU 200. The state that paddle switch (+) 104 has been operated to the "OFF operation position" corresponds to the "normally-off state" that the driver canceled the operation of paddle switch (+) 104. It is noted that paddle switch (+) 104 may transmit an OFF (+) signal to ECU 200 when it is moved to the OFF operation position.

Similarly, for example, when the driver performs an operation to pull a lever portion of paddle switch (−) 104 toward the driver so that paddle switch (−) 106 moves to an ON operation position shown with a dashed line in FIG. 2, the ON (−) signal is output from paddle switch (−) 106 to ECU 200. The state that paddle switch (−) 106 has been operated to the "ON operation position" corresponds to the "operated state" that the driver operated paddle switch (−) 106 to a predetermined position.

When the driver canceled the operation of paddle switch (−) 106 or when the driver's operation is not accepted, paddle switch (−) 106 is held at a position corresponding to the OFF operation position shown with a solid line in FIG. 2, by a mechanical mechanism or the like with the use of an elastic member such as a spring. Here, paddle switch (−) 106 stops output of the ON (−) signal to ECU 200. The state that paddle switch (−) 106 has been operated to the "OFF operation position" corresponds to the "normally-off state" that the driver canceled the operation of paddle switch (−) 106. It is noted that paddle switch (−) 106 may transmit an OFF (−) signal to ECU 200 when it is moved to the OFF operation position.

When ECU 200 receives the ON (+) signal from paddle switch (+) 104 but does not receive the ON (−) signal from paddle switch (−) 106 while the manual shift change mode is selected, ECU 200 transmits the shift change control signal to transmission 300 so as to increase by one the current stage of the shift stage (to make up-shifting).

When ECU 200 receives the ON (+) signal from paddle switch (+) 104 but does not receive the ON (−) signal from paddle switch (−) 106 while the automatic shift change mode is selected, ECU 200 transmits the shift change control signal and the mode switching control signal to transmission 300 so as to increase by one the current stage of the shift stage and to switch from the automatic shift change mode to the manual shift change mode at the time point when output of the ON (+) signal from paddle switch (+) 104 is stopped.

When ECU 200 receives the ON (−) signal from paddle switch (−) 106 but does not receive the ON (+) signal from paddle switch (+) 104 while the manual shift change mode is selected, ECU 200 transmits the shift change control signal to transmission 300 so as to decrease by one the current stage of the shift stage (to make down-shifting).

When ECU 200 receives the ON (−) signal from paddle switch (−) 106 but does not receive the ON (+) signal from paddle switch (+) 104 while the automatic shift change mode is selected, ECU 200 transmits the shift change control signal and the mode switching control signal to transmission 300 so as to decrease by one the current stage of the shift stage and to switch from the automatic shift change mode to the manual shift change mode at the time point when output of the ON (−) signal from paddle switch (−) 106 is stopped.

When ECU 200 receives the ON (+) signal from paddle switch (+) 104 and the ON (−) signal from paddle switch (−) 106 in parallel while the shift range of transmission 300 is set to the power transfer range (the D range or the R range), ECU 200 transmits the range switching control signal to transmission 300 so as to switch the shift range from the power transfer range to the N range.

Figure 3:
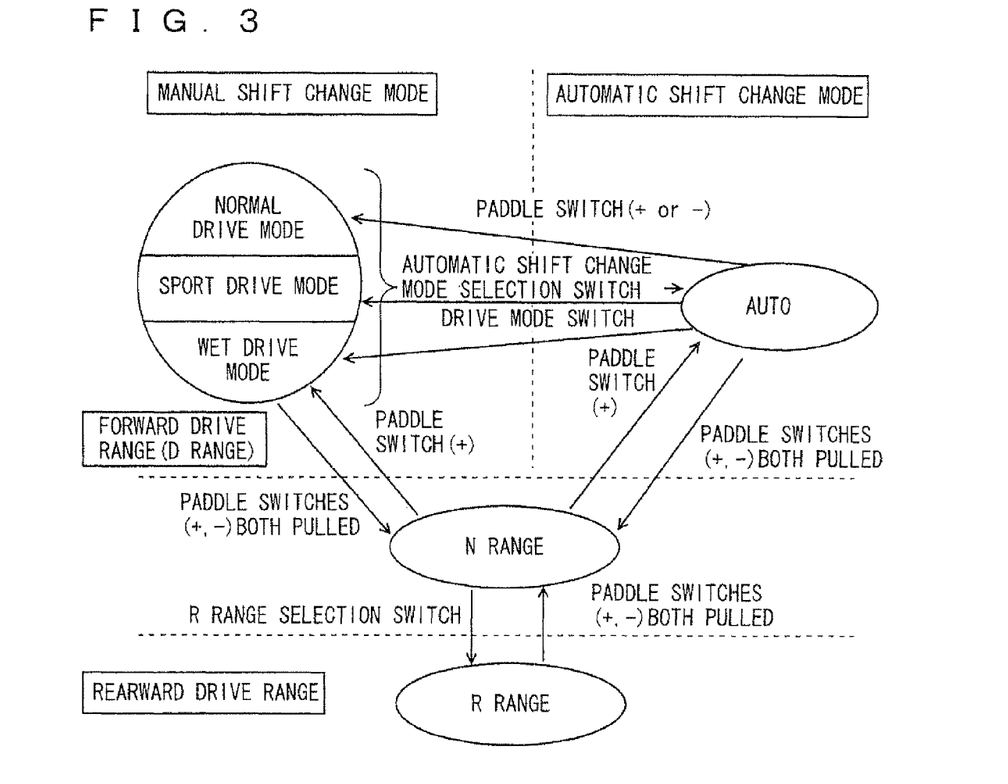
FIG. 3 is a diagram showing relation between a shift change mode and a shift range.

As shown in FIG. 3, when any of paddle switch (+) 104 and the paddle switch (−) accepted the ON operation while the automatic shift change mode is selected, the shift change mode is switched from the automatic shift change mode to the manual shift change mode.

When drive mode switch 206 accepts the operation to switch the drive mode while the automatic shift change mode is selected, the shift change mode is switched from the automatic shift change mode to the manual shift change mode.

When automatic shift change mode selection switch 202 accepts the operation to change the shift change mode while the manual shift change mode is selected, the shift change mode is switched from the manual shift change mode to the automatic shift change mode.

When drive mode switch 206 accepts the operation to switch the drive mode while the manual shift change mode is selected, any drive mode among the normal drive mode, the sport drive mode, and the wet drive mode is selected. For example, the drive mode may be changed in a predetermined order each time the switching operation of drive mode switch 206 is accepted.

When both of paddle switch (+) 104 and paddle switch (−) 106 accept the ON operation while the D range is selected, the shift range is switched from the D range to the N range.

When paddle switch (+) 104 accepts the ON operation while the N range is selected, the shift range is switched from the N range to the D range.

When both of paddle switch (+) 104 and paddle switch (−) 106 accept the ON operation while the R range is selected, the shift range is switched from the R range to the N range.

When R range selection switch 204 accepts the operation to select the R range while the N range is selected, the shift range is switched from the N range to the R range.

Regarding the vehicle configured as above, while stopping at a red light, driving in heavy traffic, or the like, a driver may change the shift range of transmission 300 to the N range in order to suppress deterioration in fuel efficiency. If the shift change mode after return from the N range is predetermined, however, the driver may not be able to select a desired shift change mode unless he/she further performs an operation to change the shift change mode, following an operation to return from the N range. Therefore, the driver has to take the trouble to perform an operation for the shift change mode in returning from the N range and the operation cannot be simplified in some cases.

The present embodiment is characterized in that ECU 200 causes memory 210 to temporarily store the shift change mode selected at the time when switching from the power transfer range to the power cut-off range is made and the shift change mode stored in memory 210 is selected when indication to return from the power cut-off range to the power transfer range is made.

In the present embodiment, in an example where the shift change mode at the time of switching from the D range to the N range was set to the automatic shift change mode, ECU 200 controls transmission 300 so as to maintain the automatic shift change mode when return from the N range to the D range is indicated.

In addition, while the shift range is set to the N range and while the automatic shift change mode is selected, ECU 200 returns from the N range to the D range and holds the automatic shift change mode in response to the driver's first request operation for changing the stage of the shift stage, and selects the manual shift change mode in response to the second request operation for changing the stage of the shift stage.

Moreover, while any one of paddle switch (+) 104 and paddle switch (−) 106 is set to the operated state, ECU 200 refrains from changing the shift change mode at least until both of them enter the operated state in parallel.

When any one of paddle switch (+) 104 and paddle switch (−) 106 is set to the normally-off state from the operated state, ECU 200 changes the shift change mode.

When any one of paddle switch (+) 104 and paddle switch (−) 106 is set to the operated state, ECU 200 starts to change the stage of the shift stage.

Figure 4:
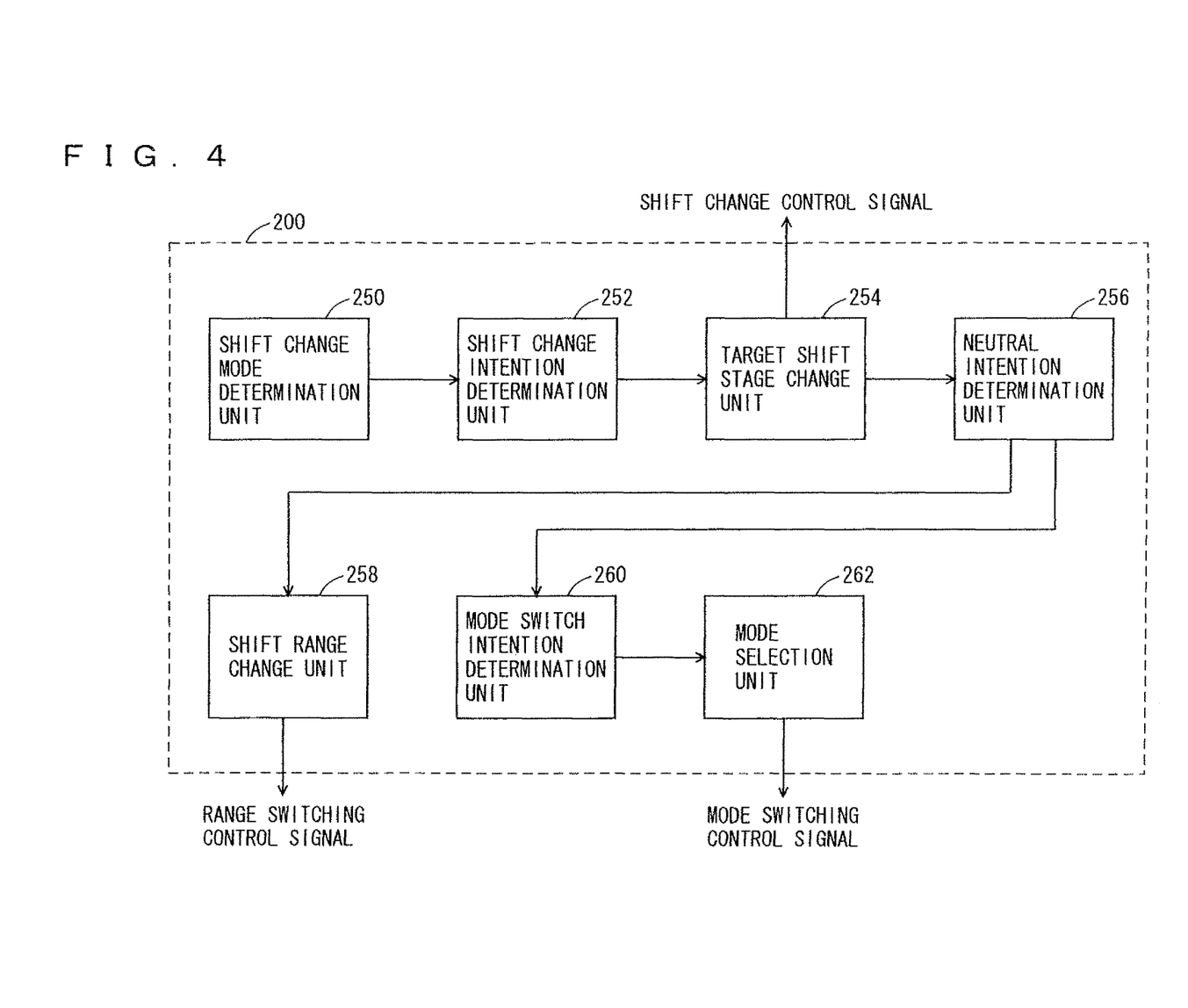
FIG. 4 is a functional block diagram of an ECU which is the vehicle control device according to the present embodiment.

FIG. 4 shows a functional block diagram of ECU 200 which is the vehicle control device according to the present embodiment. ECU 200 includes a shift change mode determination unit 250, a shift change intention determination unit 252, a target shift stage change unit 254, a neutral intention determination unit 256, a shift range change unit 258, a mode switch intention determination unit 260, and a mode selection unit 262.

Shift change mode determination unit 250 determines whether the automatic shift change mode has been selected or not. For example, shift change mode determination unit 250 reads the currently selected shift change mode from memory 210 and determines whether the read shift change mode is the automatic shift change mode or not. It is noted that shift change mode determination unit 250 may turn on a mode determination flag, for example, when the automatic shift change mode has been selected.

Shift change intention determination unit 252 determines whether the driver has intention to make shift change or not. Specifically, shift change intention determination unit 252 determines whether any one of paddle switch (+) 104 and paddle switch (−) 106 accepted the ON operation or not. For example, when shift change intention determination unit 252 received any one signal out of the ON (+) signal and the ON (−) signal, shift change intention determination unit 252 determines that the driver has intention to make shift change.

It is noted that shift change intention determination unit 252 may turn on a shift change intention determination flag, for example, when it is determined that the driver has intention to make shift change.

While the automatic shift change mode is selected and when any one of paddle switch (+) 104 and paddle switch (−) 106 accepted the ON operation, target shift stage change unit 254 changes a target shift stage.

Specifically, while the automatic shift change mode is selected and when target shift stage change unit 254 receives the ON (+) signal from paddle switch (+) 104 but does not receive the ON (−) signal from paddle switch (−) 106, target shift stage change unit 254 transmits the shift change control signal to transmission 300 such that a shift stage increased by one (up-shifted) from the current stage of the shift stage is set as the target shift stage and the current shift stage is set to the set target shift stage.

Alternatively, while the automatic shift change mode is selected and when target shift stage change unit 254 receives the ON (−) signal from paddle switch (−) 106 but does not receive the ON (+) signal from paddle switch (+) 104, target shift stage change unit 254 transmits the shift change control signal to transmission 300 such that a shift stage decreased by one (down-shifted) from the current stage of the shift stage is set as the target shift stage and the current shift stage is set to the set target shift stage.

It is noted that, for example, when the shift change mode determination flag is ON and when the shift change intention determination flag is ON, target shift stage change unit 254 may change the target shift stage.

Neutral intention determination unit 256 determines whether the driver has intention to change the shift range to the N range or not. Specifically, neutral intention determination unit 256 determines that the driver has intention to change the shift range to the N range when it receives the ON (+) signal and the ON (−) signal from paddle switch (+) 104 and paddle switch (−) 106 in parallel. While neutral intention determination unit 256 receives any one signal out of the ON (+) signal and the ON (−) signal from paddle switch (+) 104 and paddle switch (−) 106 and then when it receives the other signal, neutral intention determination unit 256 determines that the driver has intention to change the shift range to the N range.

It is noted that, for example, when the shift change intention determination flag is on, neutral intention determination unit 256 may determine whether the driver has intention to change the shift range to the N range or not, and when it determined that the driver has intention to change the shift range to the N range, it may turn on an N range intention determination flag.

When it is determined that the driver has intention to change the shift range to the N range, shift range change unit 258 transmits the range switching control signal to transmission 300 so as to switch the shift range from the D range to the N range. It is noted that, for example, while the N range intention determination flag is on, shift range change unit 258 may control transmission 300 so as to switch the shift range from the D range to the N range. In addition, shift range change unit 258 makes change to the N range and causes memory 210 to store the shift change mode selected at the time of switching from the D range to the N range (that is, the automatic shift change mode).

When shift range change unit 258 determined that the driver does not have intention to change the shift range to the N range, mode switch intention determination unit 260 determines whether the driver has intention to switch the shift change mode or not.

Specifically, when paddle switch (+) 104 and paddle switch (−) 106 accept the OFF operation after they accepted the ON operation, mode switch intention determination unit 260 determines that the driver has intention to switch the shift change mode.

For example, when mode switch intention determination unit 260 no longer receives any one signal out of the ON (+) signal and the ON (−) signal (or it receives the OFF signal) after it received that any one signal, mode switch intention determination unit 260 determines that the driver has intention to switch the shift change mode.

It is noted that, for example, when the N range intention determination flag is off, mode switch intention determination unit 260 may determine whether the driver has intention to switch the shift change mode or not, and when it determined that the driver has intention to switch the shift change mode, it may turn on a mode switch intention determination flag.

When mode switch intention determination unit 260 determined that the driver has intention to switch the shift change mode and when such determination is the first determination after return from the N range, mode selection unit 262 refrains from switching the shift change mode and maintains the automatic shift change mode. Namely, mode selection unit 262 maintains the shift change mode read from memory 210 (that is, the automatic shift change mode) and refrains from switching the shift change mode.

When mode switch intention determination unit 260 determined that the driver has intention to switch the shift change mode and such determination is not the first determination after return from the N range (that is, the second determination), mode selection unit 262 transmits the mode switching control signal to transmission 300 so as to switch the shift change mode from the automatic shift change mode to the manual shift change mode. Mode selection unit 262 causes memory 210 to store the new shift change mode (that is, the manual shift change mode). Display device 208 displays the shift change mode stored in memory 210 (that is, the manual shift change mode) as the currently selected shift change mode.

It is noted that, for example, when the mode switch intention determination flag is on, mode selection unit 262 may maintain the automatic shift change mode or switch the shift change mode from the automatic shift change mode to the manual shift change mode, in accordance with whether the number of times of determination made as the driver having intention to switch the shift change mode after return from the N range is one or not.

In the present embodiment, shift change mode determination unit 250, shift change intention determination unit 252, target shift stage change unit 254, neutral intention determination unit 256, shift range change unit 258, mode switch intention determination unit 260, and mode selection unit 262 are all described as functioning as software implemented by execution of a program stored in memory 210 by the CPU of ECU 200, however, they may be implemented by hardware. Such a program is recorded on a storage medium and mounted on the vehicle.

Figure 6:
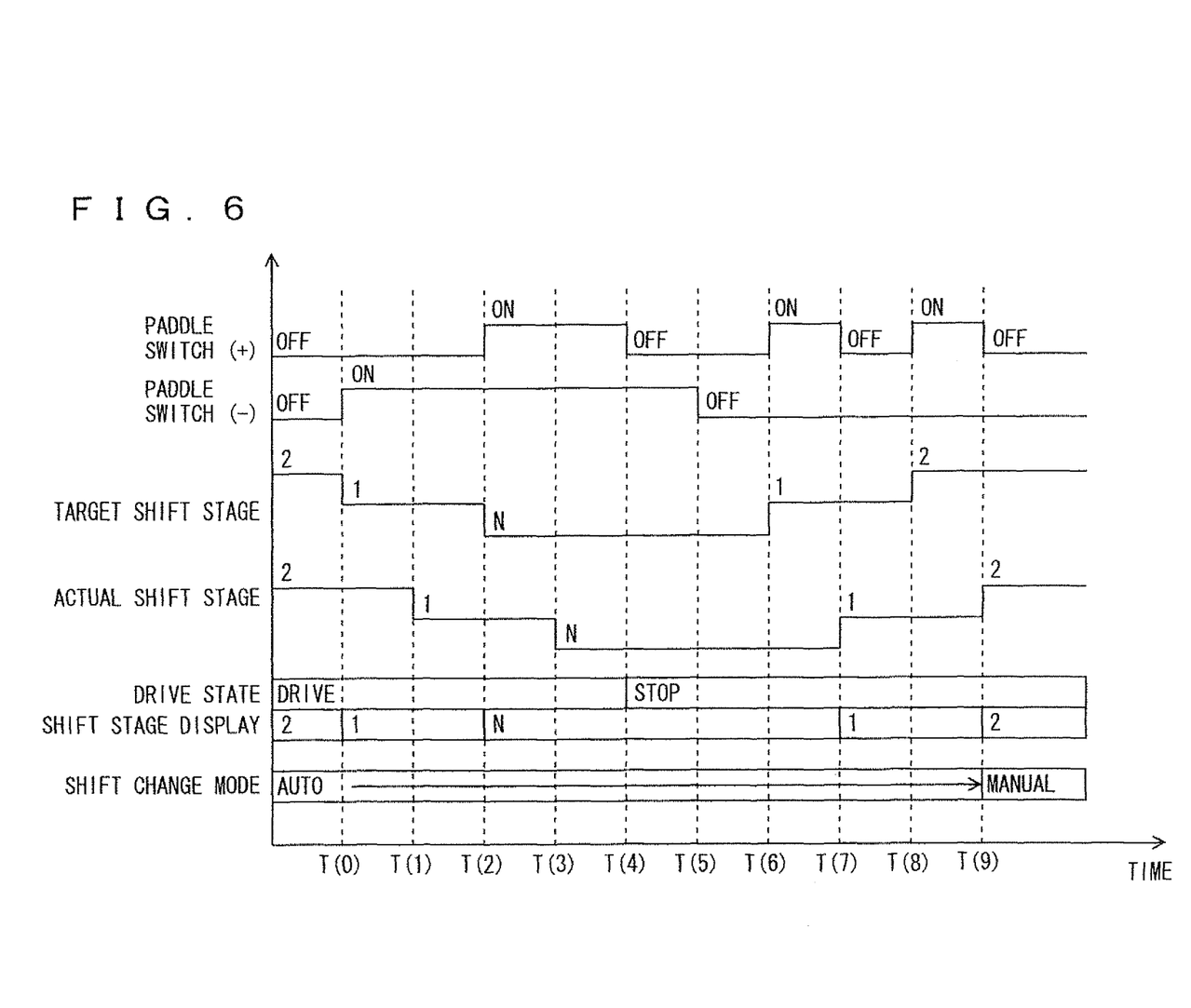
FIG. 6 is a timing chart showing an operation of the ECU which is the vehicle control device according to the present embodiment.

A control structure of a program executed by ECU 200 which is the vehicle control device according to the present embodiment will be described with reference to FIG. 6.

Figure 5:
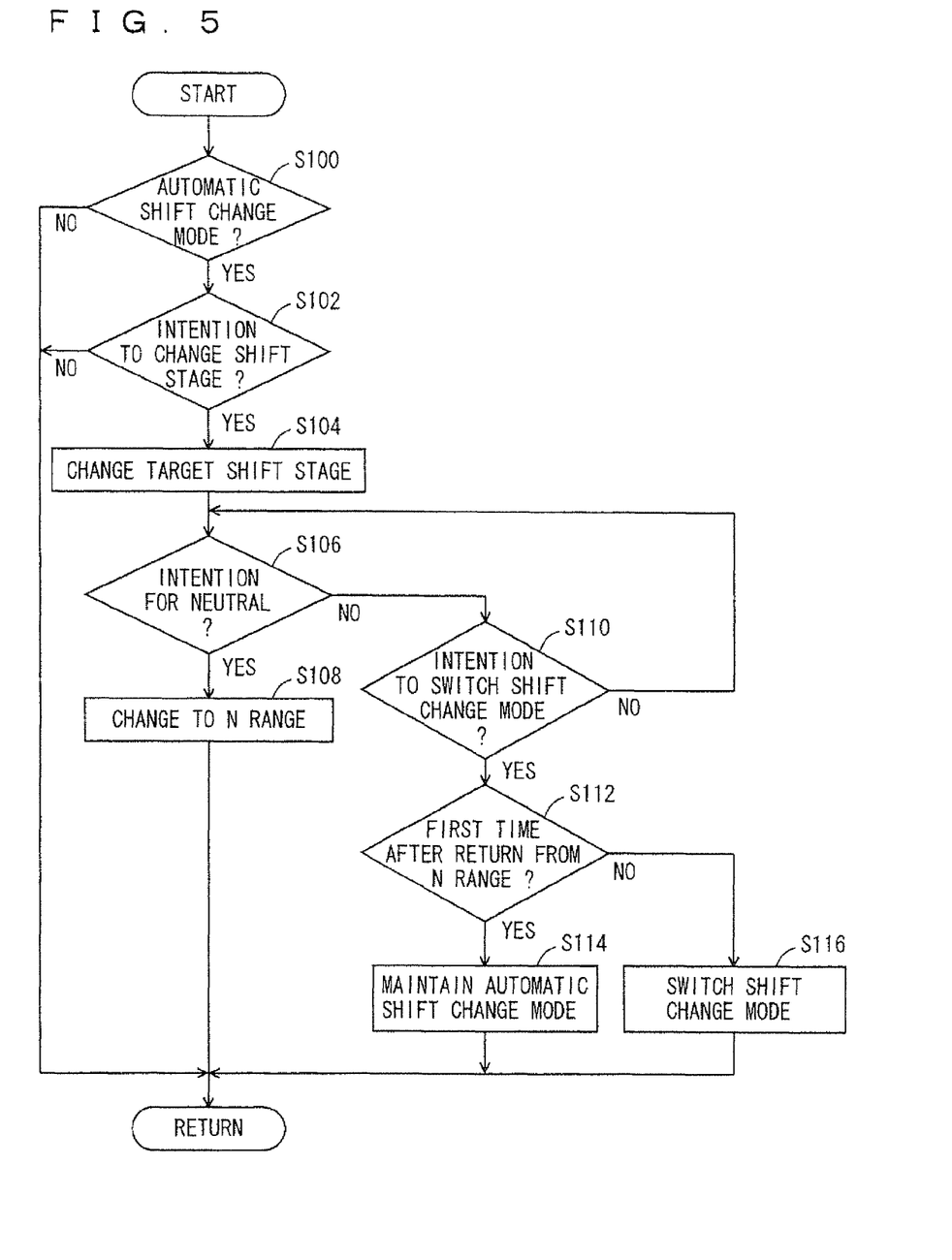
FIG. 5 is a flowchart showing a control structure of a program executed by the ECU which is the vehicle control device according to the present embodiment.

In step (hereinafter the step is denoted as S) 100, ECU 200 determines whether the currently selected shift change mode is the automatic shift change mode or not. When the currently selected shift change mode is the automatic shift change mode (YES in S100), the process proceeds to S102. Otherwise (NO in S100), this process ends.

In S102, ECU 200 determines whether the driver has intention to make shift change or not. When the driver has intention to make shift change (YES in S102), the process proceeds to S104. Otherwise (NO in S102), this process ends.

In S104, ECU 200 controls transmission 300 so as to change the target shift stage to make up-shifting or down-shifting based on the driver's intention to make shift change. In S106, ECU 200 determines whether the driver has intention to change the shift range to the N range or not. When the driver has intention to change the shift range to the N range (YES in S106), the process proceeds to S108. Otherwise (NO in S106), the process proceeds to S110.

In S108, ECU 200 controls transmission 300 so as to switch the shift range from the D range to the N range. ECU 200 makes switching to the N range and causes memory 210 to store the currently selected shift change mode (the automatic shift change mode). In S110, ECU 200 determines whether the driver has intention to switch the shift change mode or not. When it is determined that the driver has intention to switch the shift change mode (YES in S110), the process proceeds to S112. Otherwise (NO in S110), the process returns to S106.

In S112, ECU 200 determines whether or not determination as having intention to switch the shift change mode is made for the first time after return from the N range. When determination as having intention to switch the shift change mode is made for the first time after return from the N range (YES in S112), the process proceeds to S114. Otherwise (NO in S112), the process proceeds to S116.

In S114, ECU 200 maintains the shift change mode read from memory 210, that is, the automatic shift change mode. In S116, ECU 200 switches the shift change mode from the automatic shift change mode to the manual shift change mode.

An operation of ECU 200 which is the vehicle control device according to the present embodiment based on the structure and the flowchart as above will be described with reference to FIG. 6.

For example, a case where the target shift stage and the current shift stage (the actual shift stage) are the second stage and the automatic shift change mode is selected is assumed.

When the automatic shift change mode is selected (YES in S100) and when both of paddle switch (+) 104 and paddle switch (−) 106 are OFF (NO in S102), the second stage which is the shift stage in accordance with the state of the vehicle is maintained as the target shift stage. Therefore, the second stage is maintained also as the actual shift stage. In addition, display device 208 provides display showing that the automatic shift change mode is selected and the current shift stage is set to the second stage.

At a time T(0), when paddle switch (−) 106 accepts the driver's ON operation (YES in S102), the target shift stage is changed from the second stage to the first stage (S104).

While the state of reception of the ON (+) signal from paddle switch (−) 106 is maintained during a period from time T(0) to time T(2), it is determined that there is no intention to change the shift range to the N range (NO in S106) and there is no intention to change the shift change mode either (NO in S110). Therefore, neither change to the N range nor change in the shift change mode is made. Therefore, the automatic shift change mode is maintained as the shift change mode.

At time T(1), the actual shift stage is set to the first stage following the change in the target shift stage. Therefore, the actual shift stage matches with the target shift stage.

At time T(2), when the ON operation of paddle switch (+) 104 is performed while paddle switch (−) 106 accepts the ON operation, it is determined that the driver has intention to change the shift range to the N range (YES in S106). Therefore, transmission 300 is controlled such that the shift range is switched from the D range to the N range (S108). Switching to the N range is made and the current shift change mode is stored in memory 210. At a time T(3), the shift range is switched from the D range to the N range.

At a time T(4), when paddle switch (+) 104 accepts the OFF operation, vehicle 600 stops. At a time T(5), paddle switch (−) 106 accepts the OFF operation. When any OFF operation is accepted, it is determined that there is no intention to change the shift stage (YES in S100 and NO in S102).

At a time T(6), when paddle switch (+) 104 accepts the ON operation, it is determined that the driver has intention to change the shift stage (YES in S100 and YES in S102). Therefore, return from the N range is made and the target shift stage is changed to the first stage (S104).

At a time T(7), when the actual shift stage is changed to the first stage, display device 208 displays the first stage representing the current shift stage. Here, when paddle switch (+) 104 accepts the OFF operation, it is determined that the driver has no intention to change the shift range to the N range (NO in S106) and has intention to change the shift change mode (YES in S110).

When it is determined that the driver has intention to change the shift change mode after return from the N range and when the number of times of determination made is one (YES in S112), the automatic shift change mode which is the shift change mode stored in memory 210 is maintained (S114).

At a time T(8), when paddle switch (+) 104 accepts the ON operation, it is determined that the driver has intention to change the shift stage (YES in S100 and YES in S102). Therefore, the target shift stage is changed from the first stage to the second stage (S104).

At a time T(9), the actual shift stage is set to the second stage and display device 208 displays the second stage as the current shift stage. Here, when paddle switch (+) 104 accepts the OFF operation, it is determined that the driver has no intention to change the shift range to the N range (NO in S106) and has intention to change the shift change mode (YES in S110).

When the number of times of determination made as having intention to change the shift change mode after return from the N range is not one but two (NO in S112), the shift change mode is switched from the automatic shift change mode to the manual shift change mode (S116). Therefore, display device 208 provides display showing that the currently selected shift change mode is the manual shift change mode.

As described above, according to the vehicle control device of the present embodiment, the shift change mode selected at the time of switching of the shift range from the D range to the N range is temporarily stored and the stored shift change mode is selected when return from the N range to the D range is indicated.

Consequently, the shift change mode matching with the driver's intention is selected without the driver's operation to change the shift change mode after return from the power cut-off range. Therefore, the vehicle control device and the vehicle control method for setting the shift change mode matching with the driver's intention with the operation being simplified, after return from the N range, can be provided.

In addition, the shift stage at the time of start of the vehicle after the shift range returned from the N range from the D range is the same both in a case where the automatic shift change mode is selected and in a case where the manual shift change mode is selected. Therefore, in response to the first request operation for changing the stage of the shift stage, the automatic shift change mode is held while return from the N range to the D range is made. Thus, whichever shift change mode may be requested by the driver, so long as the vehicle can start as it returns from the N range in response to the first request operation, it is not contrary to the driver's intention. When the driver performs the second request operation for changing the shift stage, it can be identified that the driver is requesting selection of the manual shift change mode. Therefore, the shift change mode matching with the driver's intention can be set by selecting the manual shift change mode in response to the second request operation.

When any one of the paddle switch (+) and the paddle switch (−) accepts the ON operation, it cannot be expected whether any one of them subsequently accepts the OFF operation or the other of them accepts the ON operation, and hence it cannot be identified whether the driver is requesting change in the shift change mode or not. If the shift change mode is changed in such a state, the shift change mode may be changed frequently. Therefore, at least until both of them accept the ON operation, change in the shift change mode is refrained so that frequent change in the shift change mode can be suppressed.

When any one of the paddle switch (+) and the paddle switch (—) accepts the OFF operation while the automatic shift change mode is selected, it can be identified that the driver is requesting change to the manual shift change mode, rather than change in the shift range. Therefore, the shift change mode matching with the driver's intention can be set by changing the shift change mode to the manual shift change mode.

By starting change in the stage of the shift stage at the time point when any one of the paddle switch (+) and the paddle switch (−) accepts the ON operation, change in the stage of the shift stage can be started earlier than start of change in the stage of the shift stage at the time point of acceptance of the OFF operation. Therefore, the shift stage can be changed with good responsiveness.

In the present embodiment, description has been given assuming that, when return from the N range to the D range is indicated while the shift change mode at the time of switching from the D range to the N range is set to the automatic shift change mode, ECU 200 controls transmission 300 so as to maintain the automatic shift change mode, however, ECU 200 may maintain the manual shift change mode when return from the N range to the D range is indicated while the shift change mode at the time of switching from the D range to the N range is set to the manual shift change mode.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100 operation device; 102 steering wheel; 104 paddle switch (+); 106 paddle switch (−); 200 ECU; 202 automatic shift change mode selection switch; 204 range selection switch; 206 drive mode switch; 208 display device; 210 memory; 250 shift change mode determination unit; 252 shift change intention determination unit; 254 target shift stage change unit; 256 neutral intention determination unit; 258 shift range change unit; 260 mode switch intention determination unit; 262 mode selection unit; 300 transmission; 400 engine; 500 drive wheel; 600 vehicle

The invention claimed is:

1. A vehicle control device for controlling a vehicle incorporating an automatic transmission that selects as a shift change mode, any of an automatic shift change mode for automatically changing a speed ratio in accordance with a state of the vehicle and a manual shift change mode for changing stepwise a speed ratio in response to a driver's request, said automatic transmission switching a shift range between a power cut-off range for cutting off transfer of power from a power source and a power transfer range for transferring power from said power source, and for said automatic transmission, a plurality of shift stages that are changed in response to a request operation by said driver while said manual shift change mode is selected are set, comprising:

a range switching unit for switching said shift range in response to said driver's request; and a mode selection unit for causing return from said power cut-off range to said power transfer range and holding said automatic shift change mode in response to a first request operation by said driver for changing a stage of said shift stage after said shift range is switched to said power cut-off range from a state of selection of said automatic shift change mode, and selecting said manual shift change mode in response to a second request operation for changing a stage of said shift stage.

2. The vehicle control device according to claim 1, wherein said mode selection unit causes temporary storage of the shift change mode that has been selected when switching from said power transfer range to said power cut-off range is made by said range switching unit and selects stored said shift change mode when said range switching unit indicates return from said power cut-off range to said power transfer range.

3. The vehicle control device according to claim 1, wherein said vehicle includes a first operation member and a second operation member for said driver to request any of selection of said shift change mode, switching of said shift range, and change in a stage of said shift stage, said vehicle control device further comprises a shift stage change unit for changing a stage of said shift stage when said driver operates any one of said first operation member and said second operation member while said manual shift change mode is selected, said mode selection unit selects said manual shift change mode when said driver operates any one of said first operation member and said second operation member while said automatic shift change mode is selected, and said range switching unit switches said shift range from said power transfer range to said power cut-off range when said driver operates both of said first operation member and said second operation member in parallel.

4. The vehicle control device according to claim 3, wherein said first operation member and said second operation member are switched between an operated state in which each of said first operation member and said second operation member has been operated by said driver to a predetermined position and a normally-off state in which an operation by said driver has been canceled, and said mode selection unit refrains from changing said shift change mode at least until both of said first operation member and said second operation member enter said operated state in parallel while any one of said first operation member and said second operation member is in said operated state.

5. The vehicle control device according to claim 3, wherein said first operation member and said second operation member are switched between an operated state in which each of said first operation member and said second operation member has been operated by said driver to a predetermined position and a normally-off state in which an operation by said driver has been canceled, and said mode selection unit changes said shift change mode when any one of said first operation member and said second operation member is set to said normally-off state from said operated state.

6. The vehicle control device according to claim 3, wherein said first operation member and said second operation member are switched between an operated state in which each of said first operation member and said second operation member has been operated by said driver to a predetermined position and a normally-off state in which an operation by said driver has been canceled, and said shift stage change unit starts to change a stage of said shift stage when any one of said first operation member and said second operation member is set to said operated state.

7. A vehicle control method for controlling a vehicle incorporating an automatic transmission that selects as a shift change mode, any of an automatic shift change mode for automatically changing a speed ratio in accordance with a state of the vehicle and a manual shift change mode for changing stepwise a speed ratio in response to a driver's request, said automatic transmission switching a shift range between a power cut-off range for cutting off transfer of power from a power source and a power transfer range for transferring power from said power source, and for said automatic transmission, a plurality of shift stages that are changed in response to a request operation by said driver while said manual shift change mode is selected are set, comprising the steps of:

switching said shift range in response to said driver's request; and returning from said power cut-off range to said power transfer range and holding said automatic shift change mode in response to a first request operation by said driver for changing a stage of said shift stage after said shift range is switched to said power cut-off range from a state of selection of said automatic shift change mode, and selecting said manual shift change mode in response to a second request operation for changing a stage of said shift stage.

8. The vehicle control method according to claim 7, wherein in said step of selecting said manual shift change mode, the shift change mode that has been selected when switching from said power transfer range to said power cut-off range is made is temporarily stored and stored said shift change mode is selected when return from said power cut-off range to said power transfer range is indicated.

9. The vehicle control method according to claim 7, wherein said vehicle includes a first operation member and a second operation member for said driver to request any of selection of said shift change mode, switching of said shift range, and change in a stage of said shift stage, said vehicle control method further comprises the step of changing a stage of said shift stage when said driver operates any one of said first operation member and said second operation member while said manual shift change mode is selected, in said step of selecting said shift change mode, said manual shift change mode is selected when said driver operates any one of said first operation member and said second operation member while said automatic shift change mode is selected, and in said step of switching said shift range, said shift range is switched from said power transfer range to said power cut-off range when said driver operates both of said first operation member and said second operation member in parallel.

10. The vehicle control method according to claim 9, wherein said first operation member and said second operation member are switched between an operated state in which each of said first operation member and said second operation member has been operated by said driver to a predetermined position and a normally-off state in which an operation by said driver has been canceled, and in said step of selecting said shift change mode, change in said shift change mode is refrained at least until both of said first operation member and said second operation member enter said operated state in parallel while any one of said first operation member and said second operation member is in said operated state.

11. The vehicle control method according to claim 9, wherein said first operation member and said second operation member are switched between an operated state in which each of said first operation member and said second operation member has been operated by said driver to a predetermined position and a normally-off state in which an operation by said driver has been canceled, and in said step of selecting said shift change mode, said shift change mode is changed when any one of said first operation member and said second operation member is set to said normally-off state from said operated state.

12. The vehicle control method according to claim 9, wherein said first operation member and said second operation member are switched between an operated state in which each of said first operation member and said second operation member has been operated by said driver to a predetermined position and a normally-off state in which an operation by said driver has been canceled, and in said step of changing a stage of said shift stage, a stage of said shift stage starts to be changed when any one of said first operation member and said second operation member is set to said operated state.

* * * * *